United States Patent
Hanao et al.

[11] Patent Number: 6,125,919
[45] Date of Patent: Oct. 3, 2000

[54] MOLD POWDER FOR CONTINUOUS CASTING AND METHOD OF CONTINUOUS CASTING

[75] Inventors: Masahito Hanao; Masayuki Kawamoto; Yoshinori Tanizawa; Seiji Kumakura, all of Kashima, Japan

[73] Assignee: Sumitomo Metal Industries, Ltd., Osaka, Japan

[21] Appl. No.: 09/134,893

[22] Filed: Aug. 17, 1998

[30] Foreign Application Priority Data

Aug. 26, 1997 [JP] Japan ..................... 9-229826
Mar. 13, 1998 [JP] Japan ................... 10-063444

[51] Int. Cl.⁷ ............................... B22D 11/108
[52] U.S. Cl. ................ 164/472; 75/305; 75/309; 75/310; 164/473
[58] Field of Search ................ 164/473, 472; 75/305, 309, 310

[56] References Cited

U.S. PATENT DOCUMENTS 4,340,426 7/1982 Tabei et al. ............... 164/473 X
5,234,488 8/1993 Ichikawa et al. ............ 75/305

FOREIGN PATENT DOCUMENTS 54-35129   3/1979   Japan .
57-70218   4/1982   Japan ........................... 75/309
59-61557   4/1984   Japan .......................... 164/473
60-191645  9/1985   Japan .......................... 164/473
3-118947   5/1991   Japan .......................... 164/473
3-193248   8/1991   Japan .
5-15955    1/1993   Japan .
5-269560  10/1993   Japan .

Primary Examiner—J. Reed Batten, Jr.
Attorney, Agent, or Firm—Burns, Doane, Swecker & Mathis, LLP

[57] ABSTRACT

A mold powder for continuous steel casting, contains CaO, $SiO_2$ and fluoride as the main components. The ratio by weight of CaO', represented by the following equation, to $SiO_2$ is 0.9–2.8 and the $CaF_2$ content is about 5–60 wt. %. The powder contains $Na_2O$ in an amount of 0–25 wt. % and C in an amount of 0–10 wt. %.

$$CaO'=T.CaO-Fx(56/38)$$

wherein T.CaO represents the total Ca content in the mold powder as converted to CaO(wt. %) and F represents the total F content in the mold powder(wt. %). The powder is used in a method for continuous steel casting.

22 Claims, 3 Drawing Sheets

MOLD POWDER FOR CONTINUOUS CASTING AND METHOD OF CONTINUOUS CASTING

BACKGROUND OF THE INVENTION

1. Field of the Invention

The present invention relates to a mold powder for continuous casting which enables manufacture of a slab having excellent surface quality in the casting of steel at a high casting speed. The present invention also relates to a continuous casting method using the mold powder of this invention.

2. Description of the Related Art

Steel plates for use in outer parts of automobiles, which require excellent surface quality and high cold workability, are generally manufactured from continuously cast slabs having a thickness of about 250 mm. This is because slabs having both excellent surface quality and internal quality are required, along with high slab productivity. The casting speed is generally 2–3 m/min. A casting speed greater than this results in defects, including longitudinal cracks on the surface of a slab and residual non-metal inclusions in the slab.

On the other hand, for the past several years, there has been developed a mini-mill in which a thin slab continuous casting machine and a simple hot rolling machine are disposed in a same production line. In the method of thin slab continuous casting, from the viewpoint of productivity, a casting speed of at least about 5 m/min is the target speed to attain.

Since molten medium carbon steel causes peritectic reaction when solidified, the surface of a slab made of such steel is susceptible to longitudinal cracks. If the medium carbon steel is cast by thin slab continuous casting at a high casting speed, longitudinal cracking on its slab surface is accelerated. Also, low alloy steel often suffers longitudinal cracks on its slab surface if the low alloy steel contains an alloy element which increases susceptibility to cracking.

It is well known that a strong relationship exists between longitudinal cracking on the slab surface and mold powder. In continuous casting, molten steel is fed into a mold through an immersion nozzle, and a mold powder is applied onto the surface of the molten steel in the mold under casting. Typically, the mold powder comprises a mixture of one or more types of oxides and carbon powder or others. The mold powder added to a mold is melted by the heat of the molten steel, to thereby form a molten slag layer on the surface of the molten steel. The molten slag layer flows into the gap between a mold surface and a solidified shell, to thereby form a slag film. The slag film is cooled while in contact with the mold surface and solidified. The solidified slag film is composed of crystal and glass.

The mold powder showing the above properties has the following effects:

1) maintaining temperature of the molten steel surface in a mold and preventing oxidation of the molten steel,
2) absorbing bubbles and inclusions which are present in molten steel and float on the surface thereof,
3) securing lubrication between a mold surface and a solidified shell, and
4) adjusting cooling rate of a solidified shell through adjusting heat resistance of molten slag layer.

Of these effects, item 3), securing lubrication, is particularly important in casting at high casting speed. Also, item 4), adjusting cooling rate of the solidified shell within a mold, i.e. a slab surface, in the early stage of solidifing, is important for preventing longitudinal cracks on a slab surface.

Generally, if casting speed is increased in continuous casting, the amount of molten slag flowing into the gap between a mold surface and a solidified shell decreases. If the amount of molten slag flowing into the gap and the slag film thickness decrease accordingly, the solidified shell is restrained on the mold surface due to poor lubrication. In the worst case, this may lead to operational accidents such as breakout. In order to secure the amount of molten slag flowing into the gap, the solidification temperature of the molten slag is lowered or the viscosity of the molten slag is lowered. However, lowered solidification temperature or viscosity of molten slag often impairs uniformity of the thickness of a slag film. Consequently, the cooling rate of the solidified shell within the mold lacks uniformity, so that the slab becomes susceptible to longitudinal cracks. Therefore, an important technical objective is to create a mold powder which imparts both lubrication, which is effective in increasing the casting speed, and uniformity of cooling rate of a solidified shell, which is effective in prevention of longitudinal cracks on a slab surface.

For prevention of longitudinal cracks on a slab surface in casting at high casting speed, the following methods have been proposed: In Japanese Patent Application Laid-Open (kokai) No. 3-193248 is proposed a method of incorporating into mold powder, as accelerators of crystallization, oxides of elements belonging to Group IIIA and Group IV such as $ZrO_2$, $TiO_2$, $Sc_2O_3$, and $Y_2O_3$. Further, according to this invention a high casting speed is achieved if the viscosity of a molten slag is lowered to 1 poise or less at 1300° C. In the course of being cooled, the molten slag produces crystals which mildly cool the slab surface within a mold. This mild cooling of the slab surface makes the cooling rate of the slab surface uniform.

Also, in Japanese Patent Application Laid-Open (kokai) No. 5-15955 are proposed lowering the viscosity of a molten slag and increasing the ratio by weight of T.CaO to $SiO_2$ (T.CaO/$SiO_2$). In this method, T.CaO represents a sum of the amount of CaO contained in the mold powder and the amount of CaO converted from Ca-containing matter assumed to be present in the mold powder in the form of $CaF_2$, and is defined by the following equation (Z).

$$T.CaO\ (wt.\ \%) = CaO\ (wt.\ \%) + CaF_2(wt.\ \%) \times (56/78) \quad (Z)$$

In this invention, if T.CaO/$SiO_2$ is increased to as much as about 1.2 to 1.3, crystallization occurs in the cooling process of a molten slag, by which the slab surface within the mold is cooled mildly.

However, in the case where the mold powders proposed in the above-mentioned Japanese Patent Application Laid-Open (kokai) Nos. 3-193248 and 5-15955 are used in casting medium carbon steel containing peritectic steel, if the casting speed exceeds a certain value, mild cooling effect of a molten slag to the mold surface becomes insufficient, resulting in longitudinal cracking on the slab surface. Briefly, use of these mold powders at a casting speed of about 2–3 m/min or more may result in longitudinal cracking on the slab surface.

Apart from the above-mentioned inventions, a mold powder having a high T.CaO/$SiO_2$ ratio is proposed in Japanese Patent Application Laid-Open (kokai) No. 5-269560. This mold powder has a CaO/$SiO_2$ ratio of 1.1–1.8, and has a CaO/F ratio of 9–40.

Further, in Japanese Patent Application (filed in 1978) Laid-Open (kokai) No. 54-35129, a mold powder having a relatively high $CaO/SiO_2$ ratio is proposed. This mold powder has a $CaO/SiO_2$ ratio of 0.6–1.4, and contains fluorspar in an maximum amount of 10 wt. %.

As mentioned above, in order to prevent longitudinal cracks on a slab surface in casting medium carbon steel, low alloy steel, or low carbon steel at a casting speed of about 5 m/min or higher, the performance of mold powder is required to be further improved.

An object of the present invention is to provide a mold powder which is advantageously used in high-speed casting such as thin slab continuous casting, or in continuous casting of steel such as medium carbon steel which is susceptible to longitudinal cracks.

SUMMARY OF THE INVENTION

The mold powder for continuous steel casting according to the present invention contains CaO, $SiO_2$, and fluoride as the main components. Also, in this mold powder, the ratio by weight of CaO', represented by the following Equation (X), to $SiO_2$, i.e. $CaO'/SiO_2$, is 0.9–2.8, and the $CaF_2$ content, represented by the following Equation (Y), satisfies either of the following Condition (A) or (B). Further, this mold powder contains $Na_2O$ in an amount of 0–25 wt. % and C in an amount of 0–10 wt. %.

(A) If $CaO'/SiO_2$ is not less than 0.9 and not greater than 1.9, the $CaF_2$ content is 15–60 wt. %, or (B) If $CaO'/SiO_2$ is greater than 1.9 and not greater than 2.8, the $CaF_2$ content is 5–60 wt. %, wherein $$CaO'=T.CaO-F\times(56/38) \qquad (X),$$

$$CaF_2=F\times(78/38) \qquad (Y),$$

T.CaO: the total Ca content in the mold powder as converted to CaO (wt. %), and

F: the total F content in the mold powder (wt. %).

Specifically, under Condition (A) above, the $CaF_2$ content is preferably 20–60 wt. %. More preferably, $CaO'/SiO_2$ is 1.1–1.7 and the $CaF_2$ content is 25–50 wt. %. Under these conditions, longitudinal cracking in a slab is effectively prevented. Under Condition (B) above, $CaO'/SiO_2$ is preferably 2.1–2.6 and the $CaF_2$ content is preferably 25–50 wt. %. Under these conditions also, longitudinal cracking in a slab is effectively prevented.

The mold powder according to the present invention has a solidification temperature suitable for Continuous steel casting. If the solidification temperature is required to be lowered to a more suitable solidification temperature, $Na_2O$ in an amount of 2–25 wt. % is preferably incorporated into the mold powder. If the melting rate of the mold powder is required to be adjusted to a more suitable melting rate, C in an amount of 1–10 wt. % is preferably incorporated into the mold powder.

So long as the chemical composition of the mold powder falls within the above-mentioned scope and its viscosity at 1300° C. does not exceed 1.5 poise, sufficient lubrication is obtained even if the mold powder is applied in continuous steel casting at a high casting speed of 5 m/min or more.

By use of the mold powder of the present invention, continuous steel casting at a high casting speed can be performed without longitudinal cracking. Preferably, the mold powder of the present invention is used in casting of steel containing C in an amount of 0.05–0.20%. The mold powder of the present invention is especially effective in casting of peritectic steel containing C in an amount of 0.08–0.20%. Also the mold powder of the present invention is advantageously applied in casting of low alloy steel containing C in an amount of 0.05–0.20% and an alloy element enhancing susceptibility to cracking on a slab, such as Mn, Cr, Ni, Ti, Mo, Nb, or V. Further, the mold powder of the present invention is advantageously applied in casting of steel containing C in an amount of about 0.05% at a high casting speed of 5 m/min or higher.

The mold powder of the present invention has an increased $CaO'/SiO_2$ ratio, i.e. basicity, and produces a greater amount of crystals in the process where the mold powder in a molten state is solidified. However, if merely the basicity of the mold powder is increased, its solidification temperature is also increased, with the result that casting steel at a high casting speed is difficult. In light of the foregoing, the present inventors have solved the problem involving the conflicting properties of mold powder, i.e. the problem in which increased basicity leads to highered solidification temperature, by the following Means (a) and (b):

(a) Acceleration of Crystallization in Molten Slag

An important factor for prevention of longitudinal cracks in a slab is the uniformity of cooling rate of the solidified shell within a mold, i.e. a slab surface in the early stage of solidifing. If the cooling rate of the slab surface in the early stage of solidifing is not uniform, the thickness of the solidified shell lacks uniformity in the lateral direction of the slab. Consequently, the stress acting on the solidified shell due to shell shrinkage during solidifing is not uniformly alleviated in the lateral direction of the slab, so that longitudinal cracks are formed on the surface of the slab.

Increasing the heat resistance of a slag film formed between the mold and the solidified shell is an important factor for realizing uniform cooling of the solidified shell through the slag film. If the heat resistance of the slag film is low, the solidified shell is considerably affected by variations in cooling effect at a variety of portions of the mold. In this case, the variation of the cooling rate of the solidified shell becomes significant, and the thickness of the solidified shell lacks uniformity in the lateral direction of the mold. In contrast, if the heat resistance of the slag film is increased and the solidified shell is mildly cooled, the thickness of the solidified shell becomes uniform in the lateral direction of the mold, with the result that longitudinal cracks on the slab surface are prevented.

With regard to the mold powder of the present invention, a new index, i.e. $CaO'/SiO_2$ represented by Equations (X) and (Y) above, is employed in place of a conventional index, i.e. $T.CaO/SiO_2$, to thereby enable selection of a ternary composition containing $CaO—SiO_2—CaF_2$ as the main components by which crystallization easily occurred. With this selection, more crystallization occurs in the solidification process of molten slag, resulting in higher heat resistance of molten slag.

In a ternary composition of a mold powder containing $CaO—SiO_2—CaF_2$ as the main components, the mold powder of the present invention has a high $CaO'/SiO_2$. Therefore, more crystallization occurs in the solidification process of a molten slag. Specifically, $CaO'/SiO_2$ is as high as 0.9–2.8, resulting in an increase in the amount of crystallization.

(b) Lowering Viscosity and Rationalization of Solidification Temperature and Melting Rate in High-basicity Mold Powder The thickness of a slag film under continuous steel casting depends on the amount of molten slag flowing into the gap between a mold surface and the solidified shell within a mold. If an excessively large amount of molten slag flows into the gap, there results a large difference between the thickness of a slag film portion where the amount of molten slag is large and that where the amount of molten slag is small, with the result that the cooling rate of the solidified shell lacks uniformity. In contrast, if an excessively small amount of molten slag flows into the gap, the overall thickness of a slag film is small. In this case, a slight difference in a slag film thickness often leads to non-uniform cooling rate of the solidified shell. As mentioned above, regardless of whether an excessively large or small amount of molten slag flows into the gap, longitudinal cracks are formed in a slab. In addition, an extremely small amount of molten slag flowing into the gap may cause an operational accident such as breakout.

Especially in casting at high casting speed, the amount of molten slag flowing into the gap between a mold surface and the solidified shell within a mold tends to decrease. Therefore, an important technical objective is securing the thickness of slag film and making it uniform.

Generally, the thickness of a slag film can be controlled through adjustment of the melting point of mold powder and viscosity of mold powder in a molten state. Since the mold powder of the present invention has a ternary composition containing $CaO$—$SiO_2$—$CaF_2$ as the main components and the above-mentioned value of $CaO'/SiO_2$ is large, the mold powder generally has a high solidification temperature.

The mold powder of the present invention contains a relatively large amount of $CaF_2$, so as to lower the solidification temperature and viscosity of the molten slag. That is, if $CaO'/SiO_2$ is 0.9–1.9, suitable melting point and viscosity are obtained through incorporation of 15–60 wt. % of $CaF_2$ into the mold powder. If $CaO'/SiO_2$ is greater than 1.9 and not greater than 2.8, suitable solidification temperature and viscosity are obtained through incorporation of 5–60 wt. % of $CaF_2$ into the moldpowder.

DETAILED DESCRIPTION OF THE INVENTION

Next a powder of the present invention and a continuous casting method using the same will be described. The symbol "%" indicative of content in chemical composition means "% by weight."

(1) Chemical Composition of Mold Powder

Three main components of the mold powder of the present invention are CaO, $SiO_2$, and fluoride. Their approximate contents are as follows: CaO; 25–70%, $SiO_2$; 15–35%, and fluoride; about 5–60% (as $CaF_2$). In the present invention, the most important factors are the ratio of CaO' to $SiO_2$ ($CaO'/SiO_2$) and $CaF_2$ content.

The mold powder of the present invention produces a large amount of crystals in the process of cooling and solidification of the mold powder in a molten state. When crystallization occurs, heat resistance becomes higher as mentioned above. As a result, a slag film present between a mold surface and the solidified shell within a mold exerts an effect of preventing rapid cooling of the solidified shell, i.e. the slab surface. Next a suitable scope of the chemical composition of the mold powder of the present invention will be described, in connection with crystallization in the cooling process of a molten slag.

($CaO'/SiO_2$)

CaO' used in calculation of the ratio of CaO' to $SiO_2$ ($CaO'/SiO_2$) defined in the present invention is obtained through Equations (X) and (Y) mentioned above. In other words, CaO' is not equal to CaO which is obtained on the assumption of the analyzed value of T. Ca in a mold powder represents solely CaO. First, the $CaF_2$ content is obtained through Equation (Y), mentioned above, on the assumption that all F exists in the form of $CaF_2$ based on the analyzed value of F. Next, CaO' is obtained on the assumption that total Ca content minus Ca present in the form of $CaF_2$ equals CaO content. The value of $SiO_2$ is obtained based on the analyzed value of Si contained in the mold powder.

In the mold powder of the present invention, the $CaO'/SiO_2$ ratio is not less than 0.9 and not greater than 2.8. So long as the $CaO'/SiO_2$ ratio falls within this range, a sufficient amount of crystallization occurs when a molten slag is cooled and solidified. If the $CaO'/SiO_2$ ratio is less than 0.9, an insufficient amount of crystallization occurs. If the $CaO'/SiO_2$ ratio exceeds 2.8, the mold powder has an excessive high solidification temperature. As a result, during steel casting, the mold powder is difficult to melt at the temperature of molten steel. In this case, rationalization of the thickness of a molten slag on the molten steel surface, within a mold, and the thickness of a slag film formed between a mold surface and the solidified shell of a slab becomes difficult, resulting in accidents in continuous casting operation. Therefore, the $CaO'/SiO_2$ ratio is 0.9–2.8.

As mentioned below, if the $CaO'/SiO_2$ ratio is around 1.9, 0.9, or 2.8, crystallization does not occur easily. Therefore, the most preferable ranges of $CaO'/SiO_2$ ratio are 1.1–1.7 and 2.1–2.6.

($CaF_2$ content)

The $CaF_2$ content defined in the present invention is obtained through the above-mentioned Equation (Y). That is, a $CaF_2$ content is the value converted to $CaF_2$ based on the analyzed value of F contained in all fluorides such as NaF and $CaF_2$. However, most fluorides incorporated into the mold powder of the present invention are in the form of $CaF_2$.

In the mold powders of the present invention, the proper $CaF_2$ content is 15–60% if the $CaO'/SiO_2$ ratio is 0.9–1.9; or 5–60% if the $CaO'/SiO_2$ ratio is greater than 1.9 and not greater than 2.8. So long as the $CaF_2$ content falls within either of these ranges, a sufficient amount of crystallization occurs when a molten slag is cooled and solidified.

Figure 1:
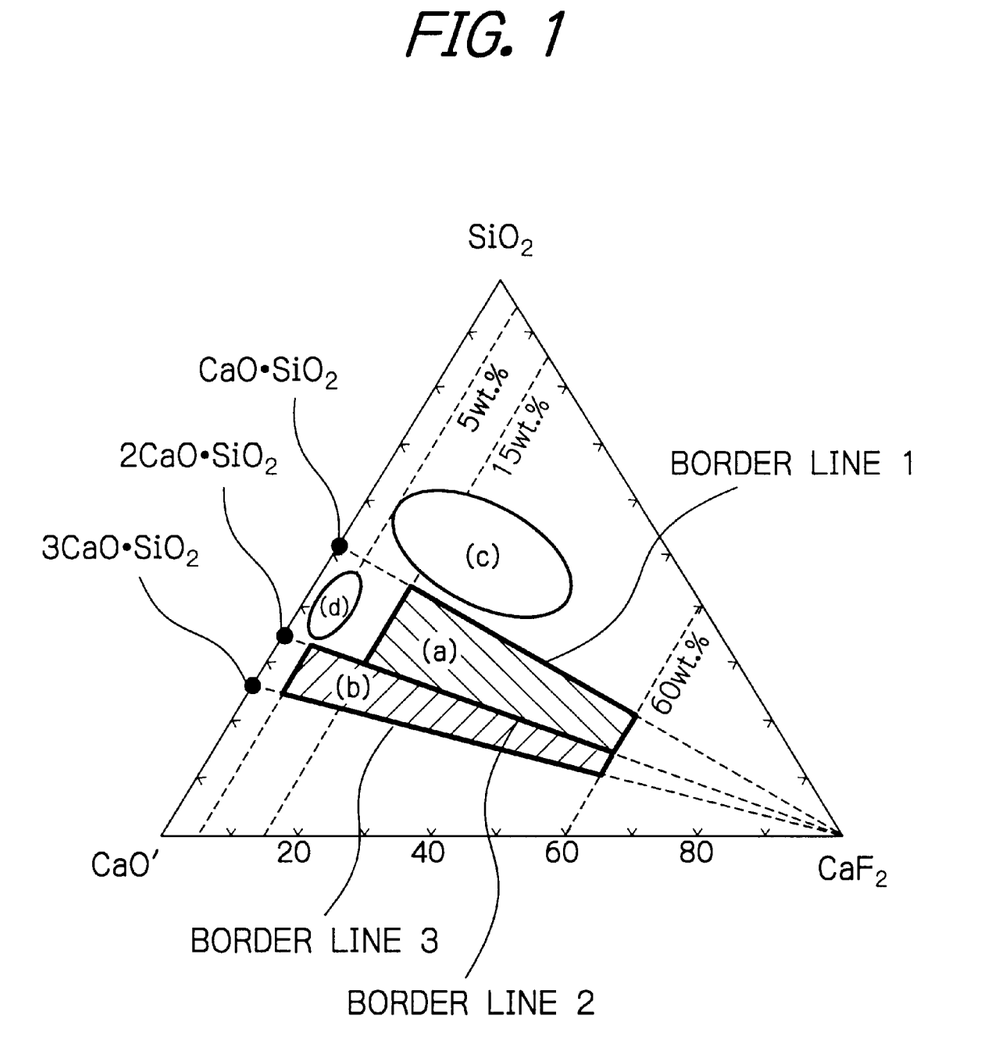
FIG. 1 is a ternary ($CaO'$—$SiO_2$—$CaF_2$) chemical composition diagram showing the scope of the chemical composition of the mold powder of the present invention.

FIG. 1 is a ternary ($CaO'$—$SiO_2$—$CaF_2$) chemical composition diagram for explaining the scope of the chemical composition of the mold powder of the present invention. Since most fluorides incorporated into the mold powders of the present invention are in the form of $CaF_2$, the CaO' content calculated through Equations (X) and (Y) above, substantially equals CaO content. Therefore, for the purpose of convenience, the mold powders of the present invention will be described with reference to the above-mentioned ternary (CaO'13 $SiO_2$—$CaF_2$) chemical composition diagram.

As shown in FIG. 1, the chemical composition of the mold powder of the present invention in which the $CaO'/SiO_2$ ratio is 0.9–1.9 and the $CaF_2$ content is 15–60 wt. % falls within region (a), i.e. the region defined by Border Line 1 on which the CaO'/SiO$_2$ ratio is 0.9 (the straight line from CaO·SiO$_2$ to 100 wt. % CaF$_2$); Border Line 2 on which the CaO'/SiO$_2$ ratio is 1.9 (the straight line from 2CaO·SiO$_2$ to 100 wt. % CaF$_2$), the straight line on which the CaF$_2$ content is 15 wt. %, and the straight line on which the CaF$_2$ content is 60 wt. %.

The chemical composition of the mold powder of the present invention in which the CaO'/SiO$_2$ ratio is greater than 1.9 and not greater than 2.8 and the CaF$_2$ content is 5–60 wt. % falls within region (b), that is, the region defined by Border Line 2 on which the CaO'/SiO$_2$ ratio is 1.9; Border Line 3 on which CaO'/SiO$_2$ is 2.9 (the straight line from 3CaO·SiO$_2$ to 100 wt. % CaF$_2$), the straight line on which the CaF$_2$ content is 5 wt. %, and the straight line on which the CaF$_2$ content is 60 wt. %.

For the purpose of comparison, the chemical composition of a conventional mold powder for mild cooling of a solidified shell is indicated by region (c). In addition, the chemical composition of the aforementioned high-basicity conventional mold powder for preventing erosion of immersion nozzles is indicated by region (d). It is apparent that the mold powder of the present invention has a CaO'/SiO$_2$ ratio, i.e. a basicity, higher than that of conventional mold powders.

Figure 2:
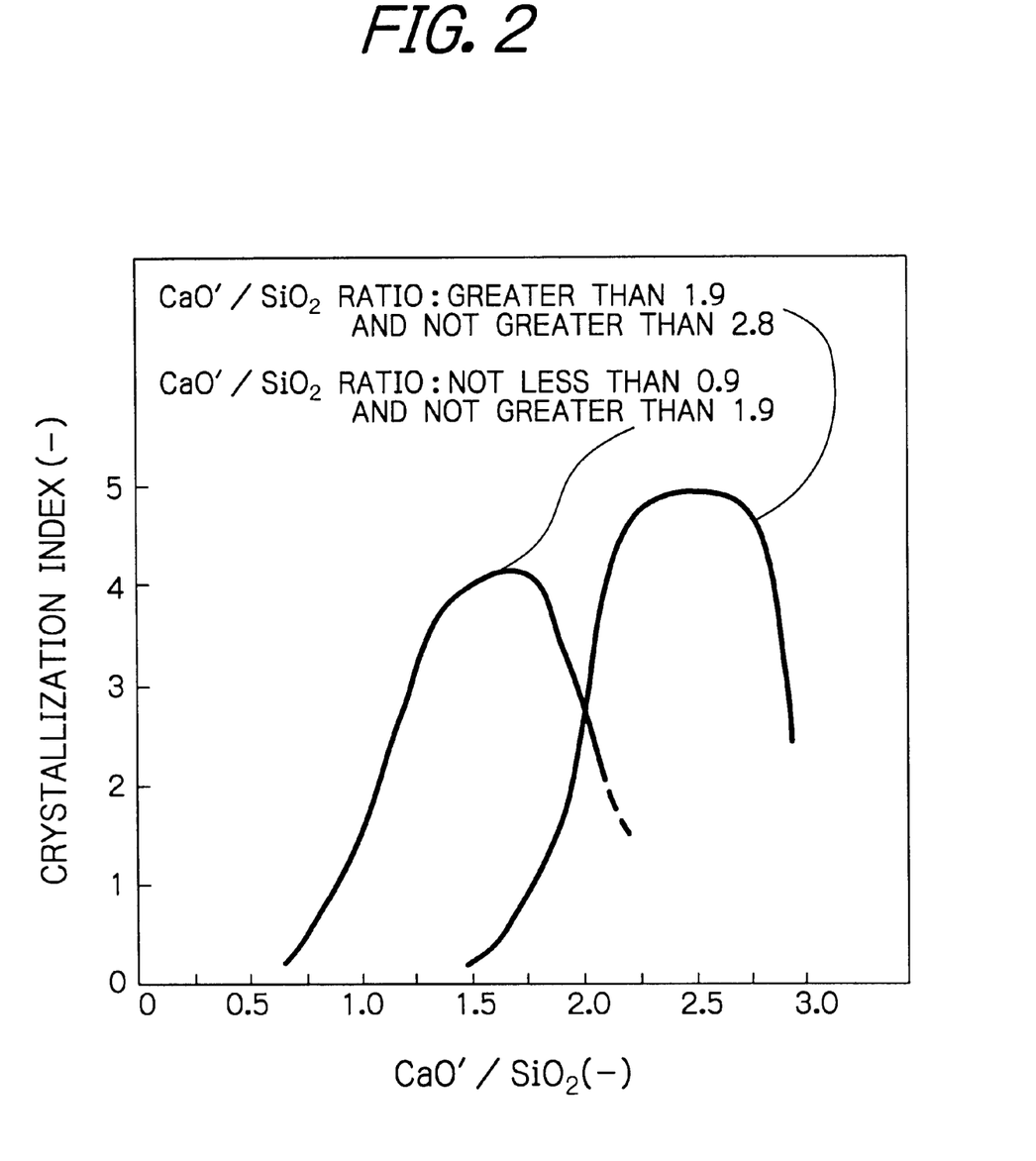
FIG. 2 is a graph showing the relationship between the crystallization index of crystallization from the mold powder of the present invention in a molten state and $CaO'/SiO_2$.

If the CaO'/SiO$_2$ ratio is 0.9–1.9 and the CaF$_2$ content is 15–60%, a large amount of crystals called cuspidine represented by a molecular formula 3CaO·2SiO$_2$·CaF$_2$ or 3CaO·2SiO$_2$ crystallize in the cooling process of a molten slag. FIG. 2 shows the relationship between the crystallization index of cuspidine crystallizing from the molten slag and CaO'/SiO$_2$ ratio. If the CaO'/SiO$_2$ ratio is 0.9–1.9 a large amount of crystallization occurs, whereas if the CaO'/SiO$_2$ ratio is less than 0.9 a small amount of crystallization occurs. For this reason, the conventional mold powders have an insufficient mild cooling effect and result in longitudinal cracking on slab surfaces. Also, as is apparent from FIG. 2, regarding the case in which the CaO'/SiO$_2$ ratio is 0.9–1.9, the range 1.1–1.7 is preferred.

Figure 3:
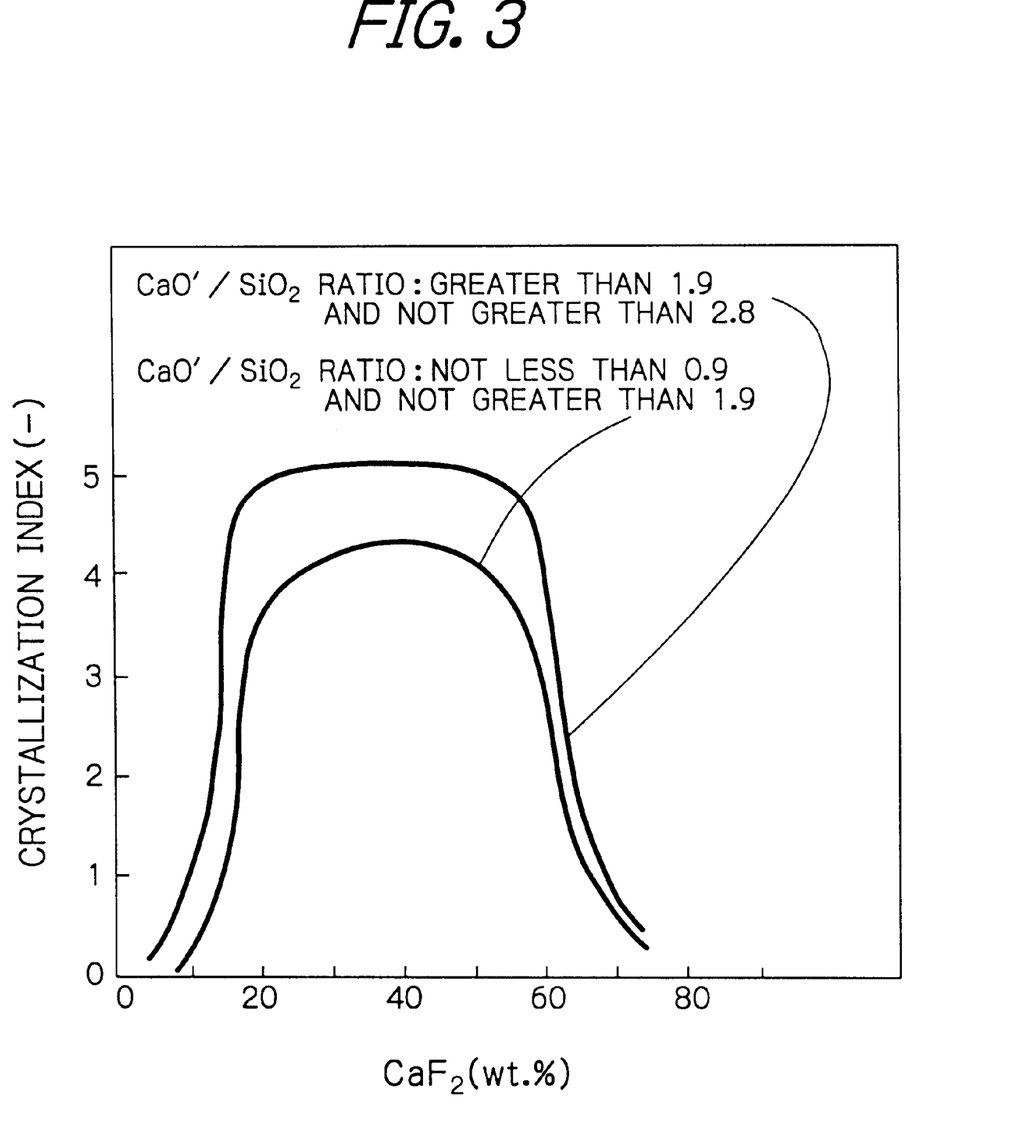
FIG. 3 is a graph showing the relationship between the crystallization index of crystallization from the mold powder of the present invention in a molten state and $CaF_2$ content.

FIG. 3 is a graph showing the influence of the CaF$_2$ content on the amount of crystallization mainly consisting of cuspidines. If the CaF$_2$ content is 15% or more, the amount of crystallization becomes considerably large, whereas if the CaF$_2$ content exceeds 60%, the amount of crystallization becomes small. If the CaF$_2$ content exceeds 60%, a immersion nozzle becomes susceptible to erosion by molten slag.

Consequently, in the case where the CaO'/SiO$_2$ ratio is 0.9–1.9, the CaF$_2$ content is preferably 15–60%, more preferably 20–60%, most preferably 25–50%. The most preferable combination of CaO'/SiO$_2$ ratio and CaF$_2$ content falls within the range where the CaO'/SiO$_2$ ratio is 1.1–1.7 and the CaF$_2$ content is 25–50%.

If the CaO'/SiO$_2$ ratio is greater than 1.9 and not greater than 2.8, crystals represented by a molecular formula (6−x)CaO·2SiO$_2$·xCaF$_2$ (x: an arbitrary number of 0–6) or 4CaO·2SiO$_2$·CaF$_2$ crystallize in the cooling process of a molten slag. FIG. 2 shows the relationship between the crystallization index of these crystals and the CaO'/SiO$_2$ ratio. If the CaO'/SiO$_2$ ratio is greater than 1.9 and not greater than 2.8, a large amount of crystallization occurs. In this case, it is characteristic that different crystals of various kinds crystallize in a large amount, as compared with the case where the CaO'/SiO$_2$ ratio is 0.9–1.9. As is apparent from FIG. 2, if the CaO'/SiO$_2$ ratio is greater than 1.9 and not greater than 2.8, the preferable range is 2.1–2.6.

FIG. 3 shows the relationship between the crystallization index and the CaF$_2$ content in the case where the CaO'/SiO$_2$ ratio is greater than 1.9 and not greater than 2.8. When the CaF$_2$ content exceeds 5%, the crystallization amount increases remarkably. Since the CaO'/SiO$_2$ ratio is large, crystals tend to crystallize easily irrespective of a low CaF$_2$ content.

When the CaF$_2$ content exceeds 60%, the crystallization amount of these crystals considerably decreases and an immersion nozzle becomes susceptible to erosion by molten slag.

Consequently, in the case where the CaO'/SiO$_2$ ratio is greater than 1.9 and not greater than 2.8, the CaF$_2$ content is preferably 5–60%, more preferably 20–60%, most preferably 25–50%. The most preferable combination of CaO'/SiO$_2$ ratio and CaF$_2$ content falls within the range where the CaO'/SiO$_2$ ratio is 2.1–2.6 and the CaF$_2$ content is 25–50%.

(2) Viscosity, Solidification Temperature, and Melting Rate of Mold Powder

As mentioned above, in casting at a casting speed of 5 m/min or higher, securing the thickness of a slag film is difficult. In order to secure the thickness of a slag film, adjusting the viscosity of a molten slag within a proper range is required.

The viscosity of molten slag for casting at a high casting speed is preferably not greater than 1.5 poise at 1300° C. In the case where the viscosity exceeds 1.5 poise, depending on the type of steel, the amount of molten slag flowing into the gap between a mold surface and the solidified shell in a mold may decrease, resulting in longitudinal cracks or difficulty in continuous casting.

Most of the mold powders having chemical compositions defined in the present invention have a solidification temperature of about 1100–1300° C. This range of solidification temperature of the mold powder is suitable for casting at a high casting speed. However, in some cases, a mold powder having the chemical composition defined in the present invention has a solidification temperature of 1300° C. or more.

In such cases, the Na$_2$O content is preferably increased so as to lower the solidification temperature of the mold powder. In order to achieve the above-mentioned effects, the Na$_2$O content is preferably 2% or more. In contrast, if the Na$_2$O content exceeds 25%, the effect of lowering the solidification temperature does not increase further. Therefore, the Na$_2$O content is preferably 2–25%. In adjustment of the solidification temperature, if the melting point is decreased, an oxide such as Li$_2$O is preferably incorporated in addition to Na$_2$O, and if the solidification temperature is increased, an oxide such as ZrO$_2$ or MgO is preferably incorporated, as appropriate.

Since C, contained in mold powder, burns slowly under continuous casting, C is an effective additive for adjusting the melting rate of mold powder and may be incorporated into mold powder as required. In order to obtain sufficient effect, the C content is preferably 1% or more. However, if the C content exceeds 10%, the melting rate of mold powder is lowered excessively, with the result that continuous casting operation becomes difficult. Consequently, the C content is preferably 1–10%.

(3) Raw Material for Mold Powder

As materials used in manufacture of the mold powder of the present invention, those commonly used for mold powder may be used. Examples of CaO sources include burnt lime, limestone, and cement. Examples of SiO$_2$ contain materials include silica sand and diatomaceous earth. Examples of CaF$_2$ contain materials include fluorspar.

Examples of $Na_2O$ contain materials include soda ash and sodium carbonate.

The grain size of these materials is preferably 100 μm or less. These materials contain oxides such as $Al_2O_3$, MgO, $Fe_2O_3$, and $Fe_3O_4$. Therefore, the mold powder unavoidably contains these oxides; however, the presence of these impurities does not cause any problems.

(4) Continuous Steel Casting Method Using the Mold Powder of the Present Invention By use of the mold powder of the present invention, steel, especially steel containing C in an amount of 0.05–0.20%, can be continuously cast in a stable manner at a high casting speed without longitudinal cracking on the slab surface.

Steel containing C, in an amount of 0.08–0.20%, causes a phase transformation called peritectic reaction. With this phase transformation, a slab surface becomes susceptible to longitudinal cracks. In addition, in casting at a high casting speed, non-uniform cooling influences the solidified shell within a mold, so that a slab surface becomes more susceptible to longitudinal cracks.

Slabs manufactured from a low alloy steel, containing C in an amount of 0.05–0.20%, and an alloy element such as Mn, Cr, Ni, Ti, Mo, Nb, or V, which increases susceptibility to cracking on a slab surface, are susceptible to longitudinal surface cracks, due to the synergistic effect of these alloy elements and C.

Also, slabs manufactured from a low carbon steel, containing C in an amount of about 0.05%, become susceptible to longitudinal surface cracks, when cast at a high casting speed of 5 m/min or higher.

However, by use of the mold powder of the present invention, the above-mentioned steels can be continuously cast at a high casting speed of 5 m/min or higher, without longitudinal cracking on the slab surfaces. Needless to say, the mold powder of the present invention is advantageously used in continuous casting of steels, containing C in an amount of less than 0.05%.

Moreover, in the case where the above-mentioned steels are cast at a low casting speed of about 2.0 m/min by use of the mold powder of the present invention, the thickness of the resultant slag film is sufficiently secured without longitudinal cracks on the surface of a slab.

EXAMPLES

Slabs each having a thickness of 100 mm and a width of 1000 mm were continuously cast by use of a curved-type continuous casting machine.

Medium carbon steel, low carbon steel, and low-carbon high-Mn steel having the compositions shown in Table 1 were cast at casting speeds of 5 m/min, 6 m/min, and 5 m/min, respectively.

TABLE 1

| Steel No. | Chemical Composition(*) | | | | | | Remark |
|---|---|---|---|---|---|---|---|
| | C | Si | Mn | P | S | sol. A 1 | |
| 1 | 0.11 | 0.03 | 0.49 | 0.014 | 0.004 | 0.042 | Midium carbon steel |
| 2 | 0.10 | 0.02 | 0.47 | 0.016 | 0.005 | 0.039 | Midium carbon steel |
| 3 | 0.05 | 0.02 | 0.22 | 0.014 | 0.003 | 0.019 | Low carbon steel |
| 4 | 0.05 | 0.16 | 1.20 | 0.023 | 0.008 | 0.026 | Low C-high Mn steel |

(*)Unit: % by weight.
Balance: Fe and incidental impurities.

The resultant slabs were tested for longitudinal cracking on their surfaces. The incidence of longitudinal cracking was indicated by Evaluations A to E. The evaluation criteria are as follows:

If the sum of the lengths of longitudinal cracks per mater of a slab is; less than 5 mm: Evaluation A, 5 mm to less than 10 mm: Evaluation B, 10 mm to less than 100 mm: Evaluation C, 100 mm to less than 500 mm: Evaluation D, and 500 mm or more: Evaluation E. Slabs of Evaluations C to E cause problems in product quality when rolled without any processing on the slab surface, whereas slabs of Evaluations A and B cause no problems in practice when rolled without any processing on the slab surface.

In the following Examples, casting tests for slabs using the mold powders of the present invention are considered tests for the continuous casting method of the present invention.

Example 1

Various medium carbon steels categorized as Steel No. 1 shown in Table 1 were cast, by use of a mold powder of the present invention having a CaO'/$SiO_2$ ratio of 0.9–1.9 and a $CaF_2$ content of 15–60%, or a conventional mold powder having a low basicity for comparison.

TABLE 2

| Test No. | Steel No. | Chemical Composition of Powder (Wt. %) | | | | | CaO' / $SiO_2$ (—) | Solidification Temperature (° C.) | Viscosity (*3) | Evaluation of Longitudinal Crack on Slab Surface | Remark |
|---|---|---|---|---|---|---|---|---|---|---|---|
| | | CaO' (*1) | $SiO_2$ | $CaF_2$ (F) (*2) | $Na_2O$ (NaF) | C | | | | | |
| 1 | 1 | 22.1 | 12.2 | 59.7 (29.1) | — | — | 1.8 | 1195 | 0.37 | A | Mold |
| 2 | 1 | 22.7 | 25.3 | 46.0 (22.4) | — | — | 0.9 | 1135 | 0.83 | B | Powder: |
| 3 | 1 | 28.2 | 18.7 | 47.0 (22.9) | — | — | 1.5 | 1124 | 0.41 | A | This |
| 4 | 1 | 29.9 | 15.7 | 48.2 (23.5) | — | — | 1.9 | 1153 | 0.27 | A | Invention |
| 5 | 1 | 34.6 | 23.2 | 36.1 (17.6) | — | — | 1.5 | 1166 | 0.34 | A | |
| 6 | 1 | 38.6 | 20.4 | 35.1 (17.1) | (1.6) | — | 1.9 | 1193 | 0.38 | A | |
| 7 | 1 | 34.4 | 22.5 | 33.7 (16.4) | 3.8 | — | 1.5 | 1188 | 0.41 | A | |
| 8 | 1 | 30.6 | 32.2 | 21.3 (10.4) | 10.2 | — | 1.0 | 1184 | 0.33 | B | |
| 9 | 1 | 37.8 | 25.5 | 20.9 (10.2) | 10.1 | — | 1.5 | 1157 | 0.32 | A | |

TABLE 2-continued

| Test No. | Steel No. | Chemical Composition of Powder (Wt. %) | | | | | CaO'/SiO₂ (—) | Solidification Temperature (° C.) | Viscosity (*3) | Evaluation of Longitudinal Crack on Slab Surface | Remark |
|---|---|---|---|---|---|---|---|---|---|---|---|
| | | CaO' (*1) | SiO₂ | CaF₂ (F) (*2) | Na₂O (NaF) | C | | | | | |
| 10 | 1 | 40.4 | 21.7 | 22.0 (10.7) | 10.3 | — | 1.9 | 1189 | 0.25 | A | |
| 11 | 1 | 33.0 | 21.6 | 18.3 (8.9) | 21.5 | — | 1.5 | 1217 | 0.19 | B | |
| 12 | 1 | 27.7 | 18.3 | 47.0 (22.9) | — | 1.5 | 1.5 | 1124 | 0.41 | A | |
| 13 | 1 | 34.1 | 22.9 | 36.4 (17.6) | — | 1.5 | 1.5 | 1165 | 0.34 | A | |
| 14 | 1 | 30.2 | 31.8 | 21.3 (10.4) | 10.2 | 1.5 | 1.0 | 1184 | 0.33 | A | |
| 15 | 1 | 32.5 | 21.2 | 18.3 (8.9) | 21.5 | 1.5 | 1.5 | 1187 | 0.41 | A | |
| 16 | 1 | 28.8 | 39.4 | 17.2 (8.4) | 8.1 | 1.5 | 0.7 | 1153 | 0.71 | D | Powder: |
| 17 | 1 | 25.0 | 37.3 | 22.3 (10.9) | 8.9 | 1.5 | 0.7 | 1194 | 0.93 | D | for com- |
| 18 | 1 | 19.0 | 37.2 | 29.1 (14.2) | 8.2 | 1.5 | 0.5 | 1053 | 0.89 | E | parison |

(*1) Value obtained through Equation (X): CaO' = T. CaO—F × (56/38), wherein T. CaO: the total Ca content in the mold powder as converted to CaO (Wt. %).
(*2) Value obtained through Equation (Y): CaF₂ = F × (78/38), wherein F: the total F content in the mold powder (Wt. %)
(*3) Measurement (poise) at 1300° C.

In Test Nos. 1–15 shown in Table 2, the mold powders of the present invention were used. In Test Nos. 16–18 were used the mold powders for comparison in which the ratio CaO'/SiO₂ was below the lower limit defined in the present invention.

Of the mold powders used in Test Nos. 1–15, those used in Test Nos. 1–6 contained CaO, SiO₂ and CaF₂ as the main components. The mold powder used in Test No. 6 contained a slight amount of NaF as another fluoride in addition to CaF₂. The mold powders used in Test Nos. 7–11 contained Na₂O in addition to the aforementioned main components. The mold powders used in Test Nos. 12 and 13 contained C in addition to the aforementioned main components. The mold powders used in Test Nos. 14 and 15 contained Na₂O and C in addition to the aforementioned main components. The mold powders used in Test Nos. 1–15 have a viscosity of 0.19–0.83 poise at 1300° C. and a solidification temperature of 1124–1217° C.

Slabs which had undergone casting by use of these mold powders were evaluated for longitudinal cracks on their surfaces, resulting in Evaluation A, which represents "excellent," in all cases except those in Test Nos. 2, 8, and 11.

The mold powders used in Test Nos. 2 and 8 had relatively small CaO'/SiO₂ ratios, 0.9 and 1.0 respectively, so that their crystallization amounts were small and mild cooling effects to slabs surface were somewhat small. Consequently, longitudinal cracks on slabs using these mold powders were all evaluated as Evaluation B.

The mold powder used in Test No. 11 had a slightly low viscosity of 0.19 at 1300° C., and longitudinal cracks of slabs cast by use of the mold powder were evaluated as Evaluation B. The mold powder used in Test No. 14 had a low CaO'/SiO₂ ratio of 1.0. No longitudinal cracks were caused in the slab, since C had been incorporated into the mold powder so as to adjust the melting rate of the mold powder.

The mold powders used for comparison in Test Nos. 16–18 contained CaO, SiO₂, and CaF₂, which are the main components of the mold powders of the present invention, and additionally contained Na₂O and C. However, these powders had a CaO'/SiO₂ ratio of 0.5–0.7, which is below the lower limit defined in the present invention.

The slabs which had undergone casting by use of these mold powders for comparison having a low basicity suffered conspicuous longitudinal cracks which were evaluated as Evaluation D or E. Consequently, it was confirmed that use of a mold powder having a CaO'/SiO₂ ratio below the lower limit 0.9, which is defined in the present invention, is disadvantageous in casting of medium carbon steel at a high casting speed of 5 m/min, since this leads to lowered slab surface quality.

Example 2

Various medium carbon steels which are categorized as Steel No. 2 shown in Table 1 were cast, by use of a mold powder of the present invention having a CaO'/SiO₂ ratio of greater than 1.9 and not greater than 2.8 and a CaF₂ content of 5–60%, or a conventional mold powder having a low basicity for comparison.

TABLE 3

| Test No. | Steel No. | Chemical Composition of Powder (Wt. %) | | | | | CaO'/SiO₂ (—) | Solidification Temperature (° C.) | Viscosity (*3) | Evaluation of Longitudinal Crack on Slab Surface | Remark |
|---|---|---|---|---|---|---|---|---|---|---|---|
| | | CaO' (*1) | SiO₂ | CaF₂ (F) (*2) | Na₂O (NaF) | C | | | | | |
| 19 | 2 | 36.2 | 15.4 | 47.6 (23.2) | — | 1.5 | 2.4 | 1219 | 0.38 | A | Mold |
| 20 | 2 | 45.3 | 19.3 | 34.8 (17.0) | (1.4) | 1.5 | 2.3 | 1224 | 0.41 | A | Powder: |
| 21 | 2 | 44.4 | 19.0 | 30.5 (15.0) | 3.0 | 1.5 | 2.3 | 1114 | 0.37 | A | This |
| 22 | 2 | 44.8 | 18.8 | 21.7 (10.6) | 8.1 | 1.5 | 2.4 | 1163 | 0.31 | A | Invention |
| 23 | 2 | 49.5 | 19.2 | 12.3 (6.0) | 12.1 | 1.5 | 2.6 | 1187 | 0.34 | B | |
| 24 | 2 | 49.4 | 20.8 | 10.1 (5.0) | 15.3 | 1.5 | 2.4 | 1189 | 0.37 | B | |
| 25 | 2 | 52.1 | 19.4 | 7.1 (3.6) | 18.4 | 1.5 | 2.7 | 1195 | 0.36 | A | |
| 26 | 2 | 44.4 | 19.0 | 30.5 (15.0) | 3.0 | 0.5 | 2.3 | 1194 | 0.37 | B | |

TABLE 3-continued

| Test No. | Steel No. | Chemical Composition of Powder (Wt. %) | | | | | CaO'/SiO$_2$ (—) | Solidification Temperature (° C.) | Viscosity (*3) | Evaluation of Longitudinal Crack on Slab Surface | Remark |
|---|---|---|---|---|---|---|---|---|---|---|---|
| | | CaO' (*1) | SiO$_2$ | CaF$_2$ (F) (*2) | Na$_2$O (NaF) | C | | | | | |
| 27 | 2 | 32.7 | 40.1 | 16.2 (8.0) | 8.9 | 1.5 | 0.8 | 1192 | 0.78 | E | Powder: for comparison |
| 28 | 2 | 52.9 | 20.8 | 2.3 (1.2) | 22.6 | 1.5 | 2.5 | 1450 | — | — | |

(*1) Value obtained through Equation (X): CaO' = T. CaO—F × (56/38),wherein T. CaO: the total Ca content in the mold powder as converted to CaO (Wt. %).
(*2) Value obtained through Equation (Y): CaF$_2$ = F × (78/38), wherein F: the total F content in the mold powder (Wt. %)
(*3) Measurement (poise) at 1300° C.

In Test Nos. 19–26 shown in Table 3, the mold powders of the present invention were used. In Test Nos. 27 and 28 were used the mold powders for comparison in which the ratio CaO'/SiO$_2$ or the CaF$_2$ content was below the lower limit defined in the present invention.

Of the mold powders used in Test Nos. 19–26, those used in Test Nos. 19 and 20 contained C in addition to the main components, i.e. CaO, SiO$_2$, and CaF$_2$. The mold powders used in Test Nos. 21–26 contained Na$_2$O and C in addition to the main components. The mold powder used in Test No. 20 contained a slight amount of NaF as another fluoride in addition to CaF$_2$. These mold powders used in Test Nos. 19–26 had a viscosity of 0.31–0.41 poise at 1300° C. and a solidification temperature of 1163–1224° C.

Slabs which had undergone casting by use of these mold powders were evaluated for longitudinal cracks on their surfaces, resulting in Evaluation A, which represents "excellent," in all cases except those in Test Nos. 23, 24, and 26. The mold powders used in Test Nos. 23 and 24 had a CaO'/SiO$_2$ ratio of 2.4–2.6; however, they had a low CaF$_2$ content of 10–12%, so that the flow amounts of their molten slag into the gap between a mold surface and a solidified shell were somewhat small. Consequently, longitudinal cracks on slabs cast by use of these mold powders were evaluated as Evaluation B.

The mold powder used in Test No. 25 also had a low CaF$_2$ content of 7%; however, it had a high CaO'/SiO$_2$ ratio of 2.7, so that its crystallization amount was large. Consequently, longitudinal cracks of slabs cast by use of the mold powder were evaluated as Evaluation A (excellent).

The mold powder used in Test No. 26 had a low C content of 0.5%, so that the thickness of its molten slag became excessively large and the flow amount of the molten slag became non-uniform. Consequently, longitudinal cracks of slabs cast by use of the mold powder were evaluated as Evaluation B.

The mold powder used for comparison in Test No. 27 contained CaO, SiO$_2$, and CaF$_2$, which are the main components of the mold powders of the present invention, and additionally contained Na$_2$O and C. However, this powder had a CaO'/SiO$_2$ ratio of 0.8, which is below the lower limit defined in the present invention.

The slab for comparison which had undergone casting by use of this mold powder suffered conspicuous longitudinal cracks which were evaluated as Evaluation E. Consequently, it was confirmed that using a mold powder having a CaO'/SiO$_2$ ratio below the lower limit 0.9 defined in the present invention is disadvantageous in casting of medium carbon steel at a high casting speed of 5 m/min, since this leads to lowered slab surface quality.

The mold powder used for comparison in Test No. 28 had a CaO'/SiO$_2$ ratio of 2.5; however, it had a CaF$_2$ content of 2.3%, which is below the lower limit defined in the present invention.

For this reason, the solidification temperature of this mold powder had a high solidification temperature of 1450° C., which made casting difficult. As a result, this mold powder was not used in casing tests for medium carbon steel.

Example 3

Various low carbon steels which are categorized as Steel No. 3 shown in Table 1 were cast, by use of a mold powder of the present invention having a CaO'/SiO$_2$ ratio of 0.9–1.9 and a CaF$_2$ content of 15–60%, or a conventional mold powder having a low basicity for comparison.

TABLE 4

| Test No. | Steel No. | Chemical Composition of Powder (Wt. %) | | | | | CaO'/SiO$_2$ (—) | Solidification Temperature (° C.) | Viscosity (*3) | Evaluation of Longitudinal Crack on Slab Surface | Remark |
|---|---|---|---|---|---|---|---|---|---|---|---|
| | | CaO' (*1) | SiO$_2$ | CaF$_2$ (F) (*2) | Na$_2$O (NaF) | C | | | | | |
| 29 | 3 | 29.8 | 21.3 | 45.8 (22.3) | — | 1.5 | 1.4 | 1196 | 0.42 | A | Powder of Invention |
| 30 | 3 | 30.1 | 20.2 | 49.9 (24.3) | 0.8 | 2.0 | 1.5 | 1219 | 0.40 | A | |
| 31 | 3 | 25.1 | 31.4 | 18.9 (9.2) | 9.6 | 2.0 | 0.8 | 1134 | 0.79 | B | Another Powder |
| 32 | 3 | 26.3 | 32.8 | 19.3 (9.4) | 9.0 | 2.0 | 0.8 | 1145 | 0.88 | B | |

(*1) Value obtained through Equation (X): CaO' = T. CaO—F × (56/38), wherein T. CaO: the total Ca content in the mold powder as converted to CaO (Wt. %).
(*2) Value obtained through Equation (Y): CaF$_2$ = F × (78/38), wherein F: the total F content in the mold powder (Wt. %)
(*3) Measurement (poise) at 1300° C.

TABLE 5

| Test No. | Steel No. | Chemical Composition of Powder (Wt. %) | | | | CaO' Solidification Temperature (° C.) | Viscosity (*3) | Evaluation of Longitudinal Crack on Slab Surface | Remark |
|---|---|---|---|---|---|---|---|---|---|
| | | CaO' (*1) | SiO$_2$ | CaF$_2$ (F) (*2) | Na$_2$O (NaF) C | SiO$_2$ (—) | | | |
| 33 | 4 | 29.2 | 20.3 | 54.0 (26.3) | —    1.5 | 1.4 | 1168 | 0.38 | A | Powder of |
| 34 | 4 | 30.4 | 22.2 | 48.4 (23.6) | 0.8  2.0 | 1.4 | 1209 | 0.41 | A | Invention |
| 35 | 4 | 22.8 | 32.4 | 20.7 (10.1) | 9.0  2.0 | 0.7 | 1165 | 0.81 | C | Another |
| 36 | 4 | 22.2 | 31.5 | 18.5 (9.0)  | 9.0  2.0 | 0.7 | 1187 | 0.69 | B | Powder |

(*1) Value obtained through Equation (X): CaO' = T. CaO—F × (56/38), wherein T. CaO: the total Ca content in the mold powder as converted to CaO (Wt. %).
(*2) Value obtained through Equation (Y): CaF$_2$ = F × (78/38), wherein F: the total F content in the mold powder (Wt. %)
(*3) Measurenent (poise) at 1300° C.

In Test Nos. 29 and 30 shown in Table 4, the mold powders of the present invention were used. In Test Nos. 31 and 32 were used the mold powders for comparison in which the ratio CaO'/SiO$_2$ was below the lower limit defined in the present invention.

The mold powder used in Test Nos. 29 and 30 contained CaO, SiO$_2$ and CaF$_2$, which are the main components of the mold powders of the present invention, and additionally contained C exclusively or Na$_2$O and C. These mold powders had a CaO'/SiO$_2$ ratio of 1.4–1.5, a CaF$_2$ content of 45–50%, a viscosity of 0.40–0.42 poise at 1300° C., and a solidification temperature of 1196–1219° C.

Slabs which had undergone casting by use of these mold powders were evaluated for longitudinal cracks on their surfaces, resulting in Evaluation A, which represents "excellent."

The mold powders used for comparison in Test No. 31 and 32 contained CaO, SiO$_2$ and CaF$_2$ which are the main components of the mold powders of the present invention, and additionally contained Na$_2$O and C. However, this powder had a CaO'/SiO$_2$ ratio of 0.8, which is below the lower limit defined in the present invention.

Slabs cast by use of these low-basicity mold powders for comparison were evaluated for longitudinal cracks, resulting in Evaluation B. The reason why these slabs suffered only a few longitudinal cracks is that they were manufactured from low carbon steel, which generally results in a few longitudinal cracking on its slab surface. However, Evaluation B for the longitudinal cracks on the surfaces of slabs cast by use of these mold powders for comparison was lower than Evaluation A for the longitudinal cracks on the surfaces of slabs cast by use of the mold powder of the present invention. Therefore, it was confirmed that the mold powder of the present invention having a high basicity is advantageously used in casting of low carbon steel at a high casting speed of 6 m/min.

Example 4

Various low-carbon high-Mn steels which are categorized as Steel No. 4 shown in Table 1 were cast, by use of a mold powder of the present invention having a CaO'/SiO$_2$ ratio of 0.9–1.9 and a CaF$_2$ content of 15–60%, or a conventional mold powder having a low basicity for comparison.

In Test Nos. 33 and 34 shown in Table 5, the mold powders of the present invention were used. In Test Nos. 35 and 36 were used the mold powders for comparison in which the ratio CaO'/SiO$_2$ was below the lower limit defined in the present invention.

The mold powder used in Test Nos. 33 and 34 contained CaO, SiO$_2$ and CaF$_2$, which are the main components of the mold powders of the present invention, and additionally contained C exclusively or Na$_2$O and C. These mold powders had a CaO'/SiO$_2$ ratio of 1.4, a CaF$_2$ content of 48–54%, a viscosity of 0.38–0.41 poise at 1300° C., and a solidification temperature of 1168–1209° C.

Slabs which had undergone casting by use of these mold powders were evaluated for longitudinal cracks on their surfaces, resulting in Evaluation A, which represents "excellent."

The mold powders used for comparison in Test No. 35 and 36 contained CaO, SiO$_2$ and CaF$_2$ which are the main components of the mold powders of the present invention, and additionally contained Na$_2$O and C. However, these powders had a CaO'/SiO$_2$ ratio of 0.7, which is below the lower limit defined in the present invention.

Slabs cast by use of these mold powders for comparison were evaluated for longitudinal cracks, resulting in Evaluation B or C. Consequently, it was confirmed that use of a mold powder having a CaO'/SiO$_2$ below the lower limit 0.9 defined in the present invention is disadvantageous in casting of low-carbon high-Mn steel at a high casting speed of 5 m/min, since this leads to lowered slab surface quality.

What is claimed is:

1. A mold powder for continuous steel casting, containing CaO, SiO$_2$ and fluoride as the main components, wherein the ratio by weight of CaO', represented by the following Equation (X), to SiO$_2$, CaO'/SiO$_2$, is 0.9–2.8 and the CaF$_2$ content represented by the following Equation (Y) satisfies either of the following Condition (A) or (B), and further containing Na$_2$O in an amount of 0–25 wt. % and C in an amount of 0–10 wt. %:

(A) if CaO'/SiO$_2$ is not less than 0.9 and not greater than 1.9, the CaF$_2$ content is 15–60 wt. %;
(B) if CaO'/SiO$_2$ is greater than 1.9 and not greater than 2.8, the CaF$_2$ content is 5–60 wt. %, wherein $$CaO'=T.CaO-F\times(56/38) \quad (X),$$

$$CaF_2=F\times(78/38) \quad (Y),$$

T.CaO: the total Ca content in the mold powder as converted to CaO (wt. %), and
F: the total F content in the mold powder (wt. %).

2. The mold powder for continuous steel casting according to claim 1, wherein the ratio CaO'/SiO$_2$ is not less than 0.9 and not greater than 1.9, and the CaF$_2$ content is 20–60 wt. %.

3. The mold powder for continuous steel casting according to claim 1, wherein the ratio CaO'/SiO$_2$ is not less than 1.1 and not greater than 1.7, and the CaF$_2$ content is 25–50 wt. %.

4. The mold powder for continuous steel casting according to claim 1, wherein the ratio CaO'/SiO$_2$ is not less than 2.1 and not greater than 2.6, and the CaF$_2$ content is 25–50 wt. %.

5. The mold powder for continuous steel casting according to claim 1, wherein Na$_2$O is contained in an amount of 2–25 wt. %.

6. The mold powder for continuous steel casting according to claim 2, wherein Na$_2$O is contained in an amount of 2–25 wt. %.

7. The mold powder for continuous steel casting according to claim 1, wherein C is contained in an amount of 1–10 wt. %.

8. The mold powder for continuous steel casting according to claim 2, wherein C is contained in an amount of 1–10 wt. %.

9. The mold powder for continuous steel casting according to claim 1, wherein Na$_2$O is contained in an amount of 2–25 wt. % and C is contained in an amount of 1–10 wt. %.

10. The mold powder for continuous steel casting according to claim 2, wherein Na$_2$O is contained in an amount of 2–25 wt. % and C is contained in an amount of 1–10 wt. %.

11. The mold powder for continuous steel casting according to claim 1, wherein the viscosity of the powder is 1.5 poise or less at 1300° C.

12. The mold powder for continuous steel casting according to claim 2, wherein the viscosity of the powder is 1.5 poise or less at 1300° C.

13. A method for continuously casting steel by use of a mold powder containing CaO, SiO$_2$ and fluoride as the main components, wherein the ratio by weight of CaO', represented by the following Equation (X), to SiO$_2$, CaO'/SiO$_2$, is 0.9–2.8 and the CaF$_2$ content represented by the following Equation (Y) satisfies either of the following Condition (A) or (B), and further containing Na$_2$O in an amount of 0–25 wt. % and C in an amount of 0–10 wt. %:

(A) if CaO'/SiO$_2$ is not less than 0.9 and not greater than 1.9, the CaF$_2$ content is 15–60 wt. %;

(B) if CaO'/SiO$_2$ is greater than 1.9 and not greater than 2.8, the CaF$_2$ content is 5–60 wt. %, wherein $$CaO' = T.CaO - F \times (56/38) \quad (X),$$

$$CaF_2 = F \times (78/38) \quad (Y),$$

T.CaO: the total Ca content in the mold powder as converted to CaO (wt. %), and

F: the total F content in the mold powder (wt. %).

14. The method for continuous steel casting according to claim 13, wherein the mold powder has a ratio CaO'/SiO$_2$ of not less than 0.9 and not greater than 1.9, and the CaF$_2$ content of 20–60 wt. %.

15. The method for continuous steel casting according to claim 13, wherein the mold powder has a ratio CaO'/SiO$_2$ of not less than 1.1 and not greater than 1.7, and the CaF$_2$ content of 25–50 wt. %.

16. The method for continuous steel casting according to claim 13, wherein the mold powder has a ratio CaO'/SiO$_2$ of not less than 2.1 and not greater than 2.6, and the CaF$_2$ content of 25–50 wt. %.

17. The method for continuous steel casting according to claim 13, wherein the mold powder has a viscosity of not greater than 1.5 poise at 1300° C.

18. The method for continuous steel casting according to claim 14, wherein the mold powder has a viscosity of not greater than 1.5 poise at 1300° C.

19. The method for continuous steel casting according to claim 13, which method is used for continuous casting of steel having a C content of 0.05–0.20 wt. %.

20. The method for continuous steel casting according to claim 14, which method is used for continuous casting of steel having a C content of 0.05–0.20 wt. %.

21. The method for continuous steel casting according to claim 15, which method is used for continuous casting of steel having a C content of 0.05–0.20 wt. %.

22. The method for continuous steel casting according to claim 16, which method is used for continuous casting of steel having a C content of 0.05–0.20 wt. %.

* * * * *